No. 630,023. Patented Aug. 1, 1899.
C. W. BAKER.
WATER AND STEAM SEPARATOR.
(Application filed Nov. 21, 1898.)

(No Model.) 4 Sheets—Sheet 1.

No. 630,023. Patented Aug. 1, 1899.
C. W. BAKER.
WATER AND STEAM SEPARATOR.
(Application filed Nov. 21, 1898.)
(No Model.) 4 Sheets—Sheet 2.
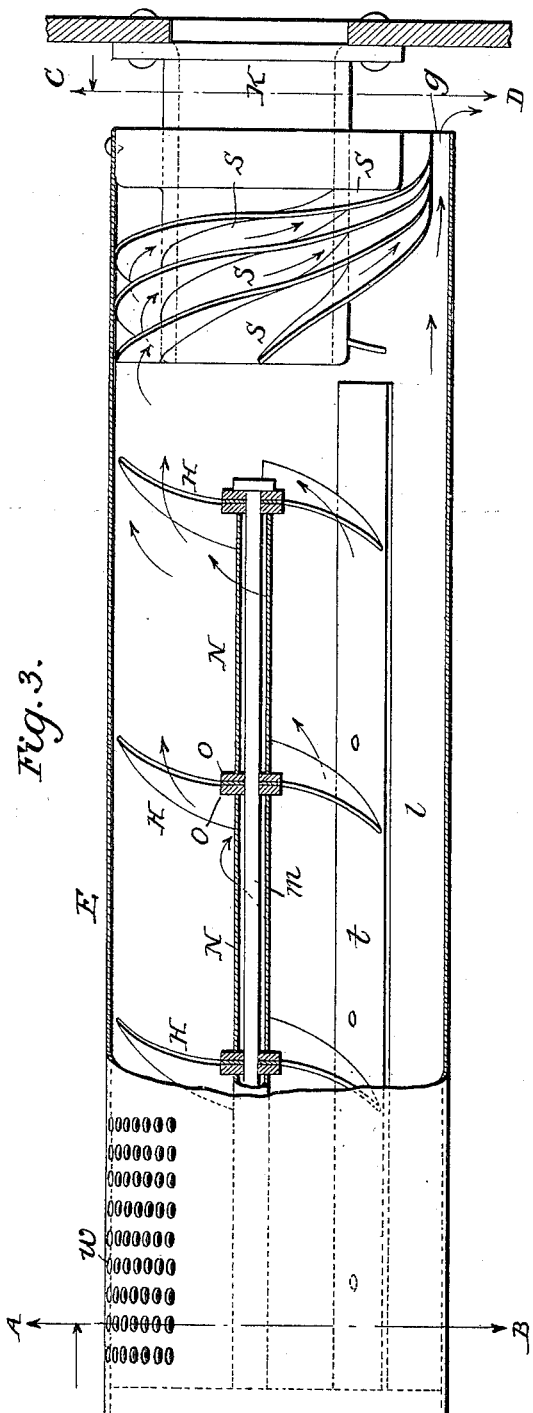
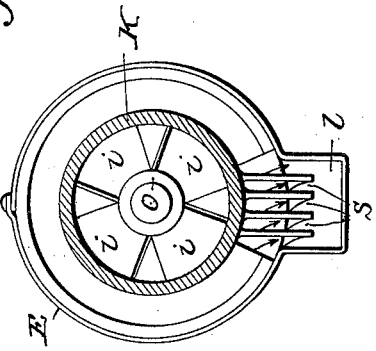
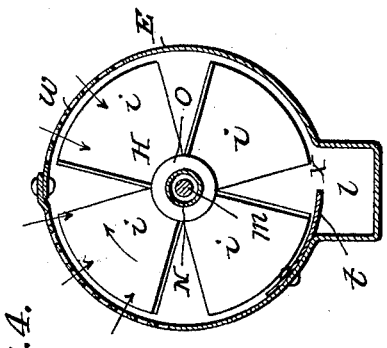
Witnesses
Inventor
Charles Whiting Baker
Attorneys
THE NORRIS PETERS CO., PHOTO-LITHO., WASHINGTON, D. C.

No. 630,023. Patented Aug. 1, 1899.
C. W. BAKER.
WATER AND STEAM SEPARATOR.
(Application filed Nov. 21, 1898.)
(No Model.) 4 Sheets—Sheet 3.
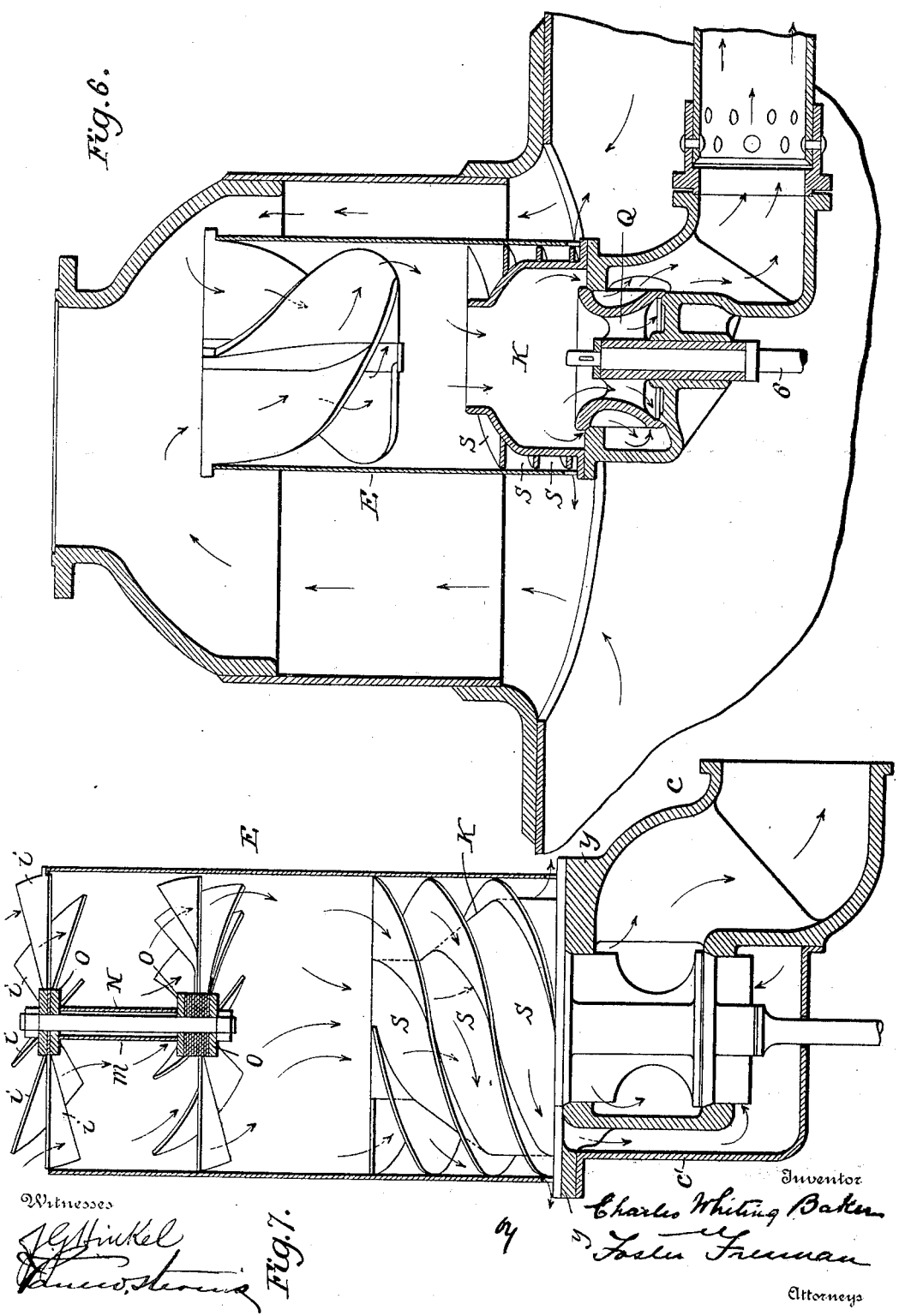

No. 630,023. Patented Aug. 1, 1899.
C. W. BAKER.
WATER AND STEAM SEPARATOR.
(Application filed Nov. 21, 1898.)
(No Model.) 4 Sheets—Sheet 4.

Witnesses
Inventor
Charles Whiting Baker
by Foster Freeman
Attorneys

UNITED STATES PATENT OFFICE.

CHARLES WHITING BAKER, OF MONTCLAIR, NEW JERSEY.

WATER AND STEAM SEPARATOR.

SPECIFICATION forming part of Letters Patent No. 630,023, dated August 1, 1899.

Application filed November 21, 1898. Serial No. 697,045. (No model.)

*To all whom it may concern:*

Be it known that I, CHARLES WHITING BAKER, a citizen of the United States, residing at Montclair, in the county of Essex and State of New Jersey, have invented certain new and useful Improvements in Water-Separators for Steam-Generators, of which the following is a specification.

My invention consists of certain improvements in that class of steam-driers or steam-separators which are designed to be placed in the interior of a steam-boiler adjacent to the steam-outlet to extract the entrained water from the steam before it passes out of the boiler.

My improvements are designed to overcome the difficulties which have heretofore been experienced with separators of this class in the disposing of the water which they extract from the steam, to project the watery particles back into the generator, to simplify and reduce the cost of the apparatus, to render it compact and applicable to boilers of various classes, and to secure its efficient working under the most severe conditions.

Figure 1:
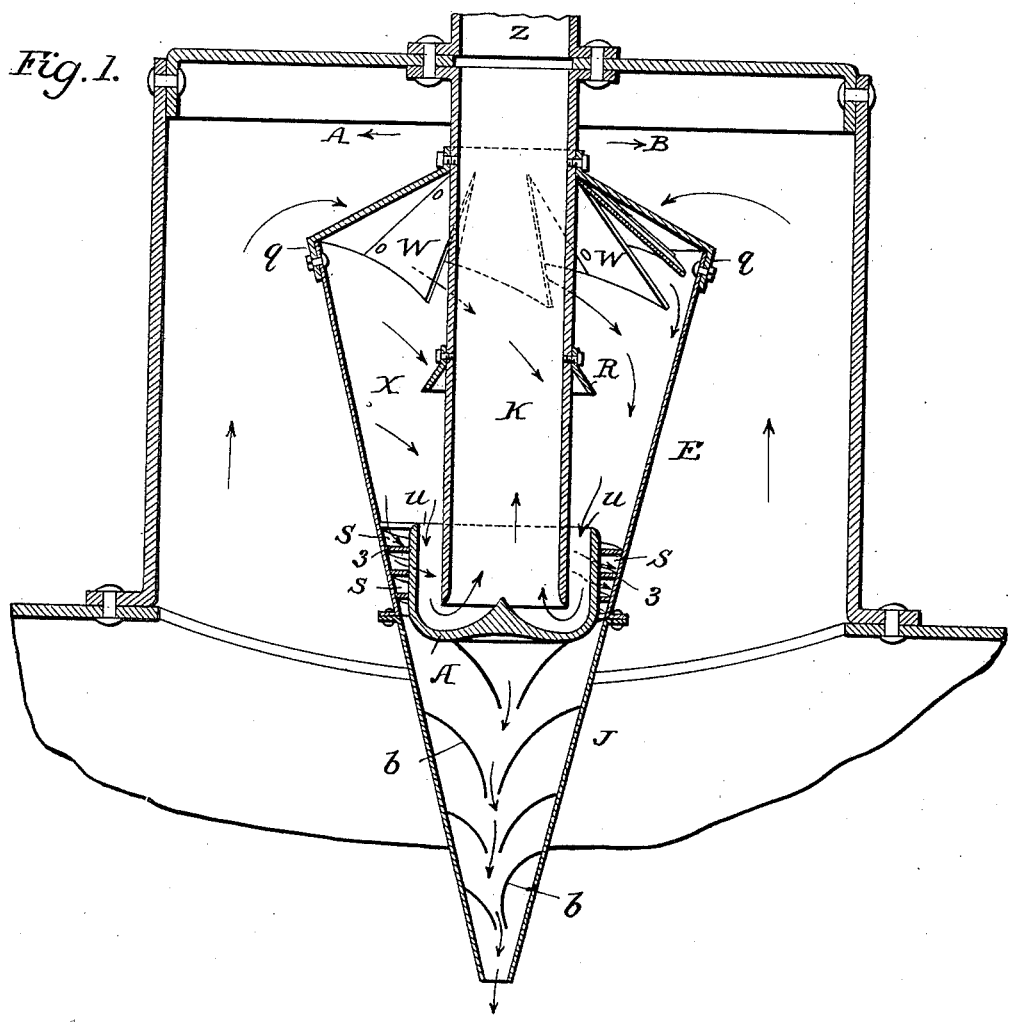
Figure 2:
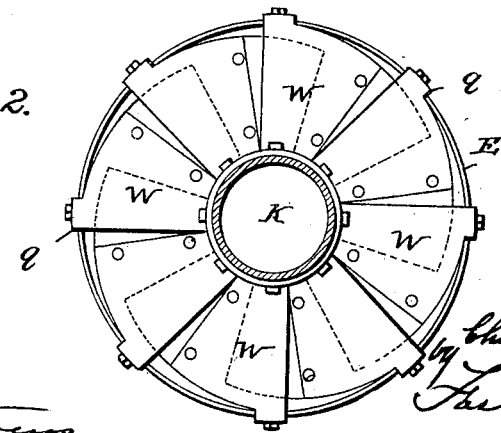
Figure 8:
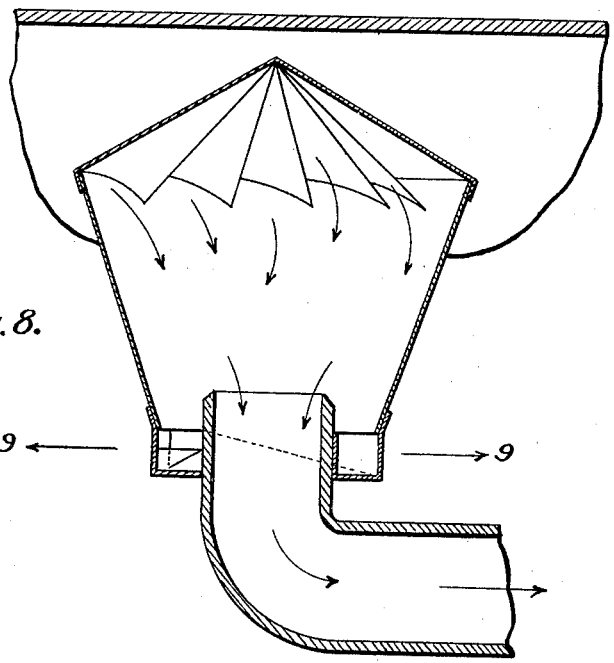
Figure 9:
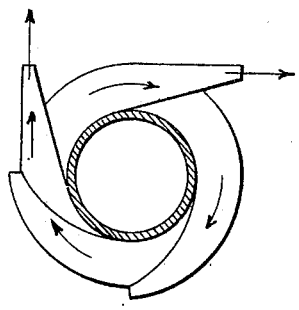

In the accompanying drawings, Figure 1 is a vertical section through the dome of a steam-boiler, having a form of my device, shown also in vertical section, attached to the steam-outlet pipe. Fig. 2 is a horizontal section of the same through the line A B in Fig. 1. Fig. 3 shows a form of my device adapted to a horizontal boiler or any type of boiler in which there is not sufficient vertical space between the top of the boiler and the water-level for the form shown in Fig. 1. Fig. 4 is a cross-sectional view of the apparatus shown in Fig. 3 through the line A B. Fig. 5 is another cross-section of Fig. 3 through the line C D. Fig. 6 is a vertical section through the dome of a locomotive-boiler, having a form of my device attached to its throttle-pipe. Fig. 7 is a vertical section of another form of my device attached to a locomotive-throttle of another form. Fig. 8 is a section of an auxiliary discharging-passage designed for use with various forms of my invention, as hereinafter set forth. Fig. 9 is a horizontal sectional view on the line 9 9, Fig. 8.

Similar figures and letters refer to similar parts throughout the several drawings.

In the design of steam-driers to be placed on the interior of steam-boilers the problem that has heretofore balked inventors has been how to get the water that is extracted from the steam back to the steam or water space of the boiler. All steam-separators operate by interposing some obstruction to the passage of the steam into or through a passage or chamber, compelling it to change the direction of its flow. The particles of water being of much greater specific gravity than the steam are thus led out of the steam-current and collected. Such obstructions to the flow of the steam, however, necessarily cause its pressure after passing them to be somewhat less than in the steam-space of the boiler. Further, the pulsations of pressure which are commonly present at the steam-pipe openings are carried back into the interior of the separator. In providing for the escape of the water from the interior of the separators to the steam-space most inventors have simply provided drip-openings at some point of their separator-chambers for the water to escape by gravity. Steam, however, is so mobile a fluid that the slight reduction of the vapor-pressure which exists on the interior of the separator will cause the steam to rush inward through any opening with great velocity and prevent wholly or partially the escape of water. Such drip-openings therefore become to a large extent merely additional entrances for undried steam instead of exits for water. Other inventors have adopted the plan of carrying a pipe from the drip-outlet to a point below the water-line of the boiler to prevent the inflow of steam; but the difficulty with this plan is that in practically all boilers the vertical height from the separator to the water-line is too small to allow a column of water in the pipe sufficient to overcome the pressure tending to force the water up it. For example, the steam-pressure in the interior of a steam-separator may often be one to three pounds less than the pressure in the boiler steam-space, and it would require two feet to six feet of water-column to balance this pressure. Besides, this arrangement is very dangerous, for any obstruction to the passage of steam into the separator may cause a large quantity of water to pass up the drip-pipe from the boiler, and thus the apparatus designed to dry the steam may actually send a fountain of water into the steam-pipe sufficient to do serious damage.

To obviate the danger just referred to, some inventors have attached a trap or U-pipe to the exit-opening for the water, one leg opening into the separator and the other and shorter leg opening into the boiler steam-space. This plan, however, meets again with the difficulty that not sufficient height is available to make the trap discharge the water against the pressure which tends to draw its contents into the separator. Further, the fluctuations of pressure in the steam-pipe cause the water in the trap to oscillate and throw the water which it collects back into the separator in spurts, and the trap is also likely to be clogged with scum and grease. Still other inventors have used drip-pipes with check-valves; but it is obvious that if the pressure be less in the interior of the separator than in the boiler such valves will simply remain closed. Even though the conditions be such that they operate temporarily, such a device as a check-valve is highly objectionable in the interior of the boiler, where it cannot be inspected and kept in order, and the dirt and grease carried by the water removed from the steam will soon render it inoperative.

In the present state of the art the only method of partially overcoming the difficulties hereinbefore set forth has been to make the separating apparatus of such large size that the steam will move through it at low velocity and the pressure on the interior of the separating-chamber will be so nearly the same as that in the boiler that the water can escape, notwithstanding the opposing steam current, but such separators are expensive and cumbrous. They interfere with the inspection of the boiler, they are but partially effective, and they are not applicable at all to boilers of limited steam-space and which are worked very hard, which are the very boilers on which an efficient system of steam-drying is most needed.

Another method of disposing of the water collected in a steam-separator was shown and described in my United States Patent No. 553,892, and consisted in the application to such separators of valves operated by the flowing steam, which allowed the water to flow by gravity through an intermediate chamber back to the steam-space of the boiler. In my pending application, Serial No. 664,263, I have provided a screw or fan propeller driven by the flowing steam, which positively forces the water back to the steam-space of the boiler as fast as collected and at the same time prevents the entrance of the steam. Both these inventions, however, involve the difficulties incident to the use of moving parts inside the boiler, and I have therefore sought for a means of positively forcing the water in the interior of separators back to the boiler steam-space without the use of moving mechanism. This I have at last accomplished by the simple expedient of causing the water and a portion of the steam in its passage through the separator to attain so high a velocity that the water will be carried into and through properly-formed water-outlet passages to the steam-space by its own momentum. This may be effected by different apparatus, as I will now describe.

Referring now to Figs. 1 and 2, Z is the steam-outlet pipe from the boiler, and K is a pipe on the interior leading to it. Steam from the boiler passes into the top of the separating-chamber X. Surrounding the pipe K is a flaring casing E, forming a funnel, and between the casing E and pipe K are helical wings W W W, &c., which impart a rapid rotation to the passing current. This causes its moisture to be thrown by centrifugal force against the walls of the chamber X, and it is carried down them by gravity and the friction of the steam-current. The steam increases its rotative velocity as it passes down the casing, and when it reaches the bottom it is whirling at such high speed that that part of it next the circumference is carried by its momentum into helical discharge-passages S S S S, formed by spiral partitions 3 3 between the casing E and a bowl A, receiving the lower end of the pipe K. These passages lead the water onward to the steam-space, while the dried steam from the center of the whirling column passes through the central discharge-opening $u$ down into the bowl and into the lower end of the steam-outlet pipe K and upward and out of the pipe Z. It will be noticed that the helical passages S S S S gradually narrow toward the bottom, thus concentrating the force of the steam entering at the mouths of these passages, according to the well-known laws of fluid flow in converging channels. It will be obvious that the current of steam passing downward will prevent any flow of steam in the contrary direction through the helical passages S S S S, and that even should such reverse flow occur momentarily the steam passing upward would so whirl in passing up the passages S S S S as to drop its moisture, and its velocity would be so checked as the passage enlarges in section toward the top that it would lose its power to prevent the flow of water in the contrary direction.

A further important advantage of this improvement is that it provides for the elimination of large bodies of water from the steam when the boiler foams, as well as for the small percentages which are regularly carried over by the steam. In separators where gravity alone is relied upon to drain away the collected water severe priming or foaming of the boiler will at times carry more water into the separator than the ordinary openings can carry away. With my device, however, when any large amount of water is carried over with the steam the water itself is set into rapid rotation and its momentum furnishes added force to propel it through the spiral passages and back into the steam-space of the boiler. Thus the force tending to free the separator of water is automatically proportioned to the amount of water to be taken care of.

In Figs. 3, 4, and 5 I have shown another application of my device. Here the separator-chamber is horizontal instead of vertical and the water is collected in a longitudinal channel 1, as hereinafter more fully described. It flows without opposition along this channel toward the exit $g$ and is carried forward and out of the exit by the flowing steam in the passages S S S S, which in this case change from helical to longitudinal. Here, as in Fig. 1, the outlet-passages converge toward the exit openings or channel, so that the pressure of the whirling steam into the mouths of the passages is concentrated to compel an outward movement from their ends.

While I have shown the dry-steam pipe K in Fig. 3 leading to the boiler-outlet as a straight pipe leading to an opening in the vertical end plate of a boiler, it will be evident that it may as readily be curved to suit a steam-nozzle placed in the top or side of a horizontal boiler-shell.

In Figs. 6 and 7 the separating apparatus is vertical, as in Fig. 1, and the device for forcing the water back to the steam-space of the boiler is likewise a series of helical passages with converging walls S S S S surrounding a central exit-pipe K for the dried steam.

I have shown in the accompanying drawings and above description my improvement in the means of water disposal from internal steam-driers in what I consider its preferable form. It will be obvious, however, that my invention can be embodied in other forms of passages from the interior of the steam-separator to the boiler steam-space. For example, the discharge-openings may be tangential to the circumference of the separator, as in Fig. 9, or of spiral form. In fact, all that is essential to my invention is that the said discharge-openings shall be so placed and formed that they will cause the momentum of the whirling steam and water in the separator to propel the aqueous particles into the steam-space of the boiler. In some cases, however, this is difficult to accomplish by even the most perfectly formed passages. I would point out, therefore, that my invention is still carried into effect even though steam should enter the separator through the discharge-passages, provided its velocity is so checked by the opposition of the current inside the separator that the water will flow more readily by gravity out of the discharge-passages rather than with the steam in the opposite direction. I have fully set forth this matter in order that other inventors may not claim as novel devices which are really less perfect forms of my invention; but I also desire to make clear that with my invention embodied in its best form reverse flow of steam into the separator will not occur. The principles to be observed to secure this end in carrying my invention into practice are, first, to interpose as little resistance as possible to the flow of steam into and through the separator consistent with securing a high rotative velocity; second, to secure such high rotative velocity; third, to place the discharge-passages where they will open to the steam-space at the point where the velocity is highest; fourth, to contract the discharge-passages toward the outlet, and, fifth, to form the discharge-passages so that steam if passing in the reverse direction through them will have to take a circuitous course to the interior of the separator. While the observance of these rules in the manner set forth in the accompanying drawings will almost always accomplish the desired end, I have also provided for cases of special difficulty the device shown in Fig. 1. This is an auxiliary discharge nozzle or casing designed to be attached to the outlet of the discharge-opening from the separator, and consists of a tapering casing J, provided with a series of baffle-plates $b\ b$, &c. These are so placed that they interpose but slight resistance to the steam-current flowing from the separator, but a large resistance to any current flowing in the opposite direction, which will be deflected and thrown into eddies by each pair of baffle-plates. The arrangement of this device is shown at $w$, Fig. 1. Instead of placing these baffle-plates $b\ b\ b$, &c., in an auxiliary discharge-passage they may be placed on the walls of the helical outlet-passages, as shown in dotted lines in Figs. 1, 3, and 6. For simplicity of construction, however, I prefer when it becomes necessary to use them to attach the casing in position beyond the outlet-passages $s$.

I will now describe one means for causing the rotation of the steam in its passage through the separator. In previous constructions of this class, where the steam has been given a whirling motion to cause it to throw off the water by centrifugal force, the helical blades or wings which impart whirling motion to the steam have been generally cast and have been difficult and expensive of manufacture. While my invention may be so made as to operate equally well with helical blades of cast metal, and I have shown an improved design thereof in Fig. 6, I have devised methods of making such helical guides whereby they may be easily and cheaply formed of sheet metal. One form of this construction is shown by Fig. 4. Here the helical elements H H H are each formed by taking a disk of sheet metal of approximately circular shape and cutting radial slots at equal intervals from its circumference part way to the center. The disk is thus divided into a series of sectors $i\ i\ i\ i$, Fig. 4, each of which is attached to a small central hub or disk, which is uncut. Each of these sectors $i\ i\ i\ i$ is then bent into an approximately helical shape either with hand-tools or by stamping in a die. A hole is then punched in the center of the disk, a rod $m$ is pushed through it, and washers O O on each side hold it firmly in place when the nuts on the end of the rod are screwed up. The tubes N N, bearing against the washers, hold the helical disks separated a suitable distance apart. In Fig. 7 the upper one of the helical elements is made in the manner just described, but with eight wings *i i*, &c., instead of four, as in Fig. 3.

It will be seen that when made in the manner above described the successive helical wings do not overlap. Such overlap, however, is generally more effective in imparting the desired rotary motion to the steam, and the lower helical element in Fig. 7 illustrates one means of obtaining it. Here each wing or blade is made separate and each has its own central disk. These wings are strung one after the other upon the rod *m* and the whole bunch is held between washers O O, as shown.

In Fig. 1 another form of sheet-metal helical element is shown. This is of a conical form, with a flange at the center for attachment to the central pipe K and projecting lugs *q q*, which support the body of the separator-chamber E. The disk is cut by successive radial slits, as before, and to each one of the leaves or wings thus formed a plate is attached by riveting or other means, which prolongs the wing under the next one and secures the overlapping before specified. A further advantage of the form shown in Fig. 1 is that the wings or vanes being inclined to the axis of the separating-chamber any water which adheres to them tends to run outward toward the wall of the separator. The same result can be secured if the several vanes of the helical bodies shown in Figs. 3 and 7 are bent into an inclined position. The danger to be guarded against in centrifugal separators having a central element with helical vanes is that the water will adhere to and travel along this element, and may thus be carried along into the exit-orifice for the dried steam. The arrangement of the helical elements in a successive series, as in Fig. 3, their inclination to the axis of the separating-chamber, as in Fig. 1, and the addition of conical collars to the central rod or tube, as at R, Fig. 1, are several means which I have shown for preventing this and causing the water to be certainly thrown outward into the whirling mass of steam.

While I have shown and described helical guides or vanes attached to a central rod or shaft, my invention will operate equally well with helical guides or flanges attached only to the walls of the separator-chamber. I prefer, however, the former construction, both for convenience and economy of manufacture, as already stated, and because it facilitates the removal of the helical bodies from the separator for inspection or cleaning.

In Figs. 6 and 7 I have shown the separating-chamber open at the top or closed only by the helical element which imparts a rotary motion to the steam. In some cases, however, it is advisable to attach some form of screen or strainer to the separator, so that any pieces of scale, &c., carried up by the foaming water may be prevented from passing into the separator and lodging there. This will not usually be needful where the separator is located in a dome, as in Figs. 1, 6, and 7. In Figs. 3 and 4 I have shown one method of making such strainer where it is an integral part of the separator, consisting in perforating the casing E at *w*, so that the openings as arranged cause a radial inflow and assist in setting up the rotary motion of the steam and effecting the first separation of the entrained water. As the mouth or end of the separator-chamber is closed, the steam enters with considerable velocity through the multitude of perforations and dashes down upon the bottom of the separator, breaking up any foam and carrying the bulk of the entrained water at once into the collecting-channel *l*. A flange or plate *t*, Figs. 3 and 4, partially covers the collecting-channel *l* and serves to protect the contents to some extent from agitation by the whirling steam. It also serves to catch under its projecting edge any particles of moisture which, being carried around by the rotation of the steam, fly off at a tangent when they reach the point X in Fig. 4.

Referring generally to the design of the elements by which rotation is imparted to the steam, it is important that whichever of the kinds I have described or other kinds be used they should be so formed as to offer the least resistance to the flow of the steam consistent with securing high rotative velocity and that where strainers are added they should be of sufficient area to enable the steam to pass through them with moderate velocity, the aim being to make the reduction from the boiler-pressure at the point where the entrained water collects as small as possible.

Referring now to Figs. 6 and 7, it is one of the chief advantages of my invention that it is applicable to locomotive-boilers. For attachment to a locomotive-boiler a separator must be so placed that the steam will pass through it and be dried before entering the throttle-valve, for the pressure in the dry pipe beyond the throttle is frequently very much less than it is in the boiler, and to return water separated in the dry pipe to the boiler against this difference of pressure has been found impracticable. Again, a steam-separator for a locomotive must be so designed that it may be readily removed to give access to the boiler through the dome and also so that it can by no possibility interfere with the operation of the throttle-valve. All these requirements I have met in the design of my improvements, and in addition I have been enabled to improve upon the ordinary arrangement of the throttle-pipe as follows: At present in locomotive-boiler construction it is the universal practice to place the throttle-valve as near the top of the steam-dome as possible in order to draw the steam from the highest point. To effect this, it is necessary to make two or three joints in the pipes placed in the dome and at its base, and one of these joints must be taken apart whenever it is desired to enter the boiler. As these joints have to be absolutely tight against the full boiler-pressure, it is highly desirable to avoid taking them apart whenever the boiler is entered.

Referring now to Fig. 6, it will be seen that with my device to dry the steam it is no longer necessary to place the throttle at the top of the dome. Instead I connect the throttle-valve casing directly to the end of the dry pipe, and by placing it to one side of the center of the dome I leave room to enter the boiler without removing or disturbing the throttle or its connections at all. The only thing requiring removal is the separator-casing E, and as that merely sets on top of the throttle-valve it may be removed by merely loosening the two or three bolts by which it is held in place and lifting it out through the dome-opening.

The throttle-valve Q in Fig. 6 is of the type known as the "Vogt" valve, having both openings at its top.

In Fig. 7 I have shown a throttle of the common type adapted to receive my separator, substantially the only change being the addition of a projecting flange $y$ $y$ at the top of the throttle-valve casing $c$ to form a base to support the separator-casing E and the extension $c'$ of the casing to inclose the throttle. The plate $y$ $y$ has slots through which the steam passes downward to the space inclosed by the part of the casing $c'$, and thus to the lower throttle-opening.

Without limiting myself to the precise construction and arrangement shown, I claim—

1. A steam-separator arranged inside a steam-boiler and provided with drainage-passages leading to the boiler steam-space, made up of plates or partitions arranged to form channels which gradually contract toward their exit-orifices, substantially as described.

2. An apparatus for separating water particles from steam-currents consisting of a casing provided with stationary vanes arranged to impart a rapid whirling motion to the current, discharge-openings and converging plates or vanes arranged to deflect the outer portion of the whirling current to the openings, substantially as described.

3. In a steam-separator placed in the steam-space of a steam-boiler, drainage-channels from its interior to the steam-space of the boiler, having gradually-contracting walls and with their mouths adapted to catch the moving currents of wet steam and water inside the separator, substantially as described.

4. An apparatus for separating watery particles from steam-currents, consisting of a casing, arranged within the steam-space of a boiler, provided with stationary vanes arranged to impart a rapid whirling motion to the current within the casing, discharge-orifices in the casing, and supplemental vanes or plates within the casing arranged to deflect the outer portion of the current to the discharge-orifices, substantially as described.

5. The combination in a steam-separator of a casing, vanes arranged to impart a whirling motion to a current of steam passing through the casing, a central discharge-passage and openings communicating directly with the boiler steam-space and arranged around said central discharge-passage, and affording an exit to the outer portion of said current, substantially as described.

6. A steam-separator arranged in the interior of a steam-boiler and provided with a casing having a central discharge-opening, and a surrounding secondary discharge-opening communicating directly with the boiler steam-space, and vanes arranged to impart a whirling motion to a steam-current passing through the casing, substantially as described.

7. In a steam-separator, apparatus for causing the rotation of the steam-current, consisting of a disk of sheet metal with its outer portion formed into vanes or wings of approximately helical form and means for securing said disk in position to intercept the flow of steam through the separator, substantially as described.

8. In a steam-separator, apparatus for causing the rotation of the steam-current, consisting of a cone of sheet metal with a portion of its surface bent into vanes or wings of approximately helical form, said cone being placed with its apex pointing against the direction of flow of the steam-current and in such position that its vanes deflect the said current, substantially as described.

9. A steam-separator comprising a casing, means for inducing rotation in a current of steam passing through the casing, a discharge-pipe at the discharge end of the casing, and a supplemental discharge-passage between the pipe and the casing and partitions arranged to form helical channels leading to the supplemental discharge-passage, substantially as described.

10. In combination, a steam-boiler having a dome, a throttle-valve within or adjacent to the dome, a steam-separator attached to the throttle-valve casing in advance of the throttle-valve, so that steam flows through the separator before entering the throttle-valve casing, and drainage-openings from the interior of said separator to the boiler steam-space adapted to discharge the currents of wet steam and water, substantially as described.

11. A steam-boiler having a dome, and a throttle-valve arranged at the base of the dome, in combination with a steam-separator within the dome with its receiving end adjacent to the top thereof, and having a dry-steam outlet leading to a chamber surrounding the throttle-valve openings, substantially as described.

12. A steam-boiler having a dome and a throttle-valve placed below and at one side of the dome in combination with a steam-separator mounted upon the throttle-valve casing and extending into the dome, and adapted to be readily detached and removed through the dome-opening, substantially as and for the purpose described.

13. A steam-boiler having a dome, a throttle-valve at the base of the dome, a centrifugal steam-separator above the valve and delivering dry steam thereto, with open drainage-channels from said separator to the steam-space, substantially as described.

14. In combination, a locomotive throttle-valve, a pipe surmounting it, means for inducing rotation of steam passing through the pipe, a central passage from the pipe to a chamber surrounding the throttle-valve openings, and peripheral passages from the pipe to the boiler steam-space, substantially as described.

15. In a steam-separator, adapted to be placed in the interior of a boiler, a casing having an opening for the discharge of the water separated from the steam, and baffle-plates arranged within the casing above the discharge-opening and adjacent thereto, substantially as and for the purpose specified.

In testimony whereof I have signed my name to this specification in the presence of two subscribing witnesses.

CHARLES WHITING BAKER.

Witnesses:
M. N. BAKER,
JN. J. SWAIM.